United States Patent
Decarreau et al.

(10) Patent No.: US 10,524,176 B2
(45) Date of Patent: Dec. 31, 2019

(54) END MARKER HANDLING FOR MOBILITY BETWEEN 5G AND LTE

(71) Applicant: Nokia Technologies Oy, Espoo (FI)

(72) Inventors: Guillaume Decarreau, Munich (DE); Benoist Sebire, Tokyo (JP)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/321,360

(22) PCT Filed: Aug. 8, 2016

(86) PCT No.: PCT/US2016/046011
§ 371 (c)(1),
(2) Date: Jan. 28, 2019

(87) PCT Pub. No.: WO2018/030982
PCT Pub. Date: Feb. 15, 2018

(65) Prior Publication Data
US 2019/0174377 A1 Jun. 6, 2019

(51) Int. Cl.
*H04W 36/08* (2009.01)
*H04W 28/06* (2009.01)
*H04W 36/30* (2009.01)
*H04W 36/32* (2009.01)

(52) U.S. Cl.
CPC ........... *H04W 36/08* (2013.01); *H04W 28/06* (2013.01); *H04W 36/30* (2013.01); *H04W 36/32* (2013.01)

(58) Field of Classification Search
CPC .................................................... H04W 36/08
USPC ......................................................... 455/436
See application file for complete search history.

(56) References Cited

FOREIGN PATENT DOCUMENTS

| EP | 2981133 A1 | 2/2016 |
|---|---|---|
| WO | 2012/096759 A1 | 7/2012 |
| WO | 2012/156856 A1 | 11/2012 |
| WO | 2016/050288 A1 | 4/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.3.0, Mar. 2016, pp. 1-295.

(Continued)

*Primary Examiner* — Joel Ajayi
(74) *Attorney, Agent, or Firm* — Nokia Technologies Oy (57) ABSTRACT

Methods and apparatus, including computer program products, are provided for mobility between networks. In some example embodiments, there may be provided a method. The method may include receiving, at a source base station, a single end marker indication for a flow associated with a user equipment being handed over to a target base station; determining, by the source base station and in response to the received single end marker indication, at least one bearer mapped to the flow; generating for each determined bearer, at least one end of marker indication; and sending, over a forwarding path from the source base station to the target base station, the generated at least one end of marker indication. Related systems, methods, and articles of manufacture are also described.

20 Claims, 4 Drawing Sheets

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401, V14.0.0, Jun. 2016, pp. 1-374.

"3rd Generation Partnership Project; Technical Specification Group Core Network and Terminals; General Packet Radio System (GPRS) Tunnelling Protocol User Plane (GTPv1-U) (Release 13)", 3GPP TS 29.281, V13.2.0, Jun. 2016, pp. 1-29.

"New SID Proposal: Study on New Radio Access Technology", 3GPP TSG RAN Meeting #71, RP-160671, NTT Docomo, Agenda Item: 9.1, Mar. 7-10, 2016, 8 pages.

"New Study on Architecture and Security for Next Generation System", 3GPP TSG SA Meeting #73, SP-160727, Rapporteurs, Agenda Item: 17, Sep. 21-23, 2016, 6 pages.

"3rd Generation Partnership Project; Technical Specification Group Services and System Aspects; Study on Architecture for Next Generation System (Release 14)", 3GPP TR 23.799, V0.5.0, May 2016, pp. 1-178.

"Functional Partitioning Proposal for S-GW, P-GW and TDF", SA WG2 Meeting #112, S2-15xxxx, ZTE, Agenda Item: 6.8, Nov. 16-20, 2015, pp. 1-11.

International Search Report and Written Opinion received for corresponding Patent Cooperation Treaty Application No. PCT/US2016/046011, dated Apr. 4, 2017, 14 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.4.0, Jun. 2016, pp. 1-310.

"3rd Generation Partnership Project; Technical Specification Group Services and System Aspects; Study on Architecture for Next Generation System (Release 14)", 3GPP TR 23.799, V0.6.0, Jul. 2016, pp. 1-321.

END MARKER HANDLING FOR MOBILITY BETWEEN 5G AND LTE

RELATED APPLICATION

This application was originally filed as PCT Application No. PCT/US2016/046011 filed Aug. 8, 2016.

FIELD

The subject matter described herein relates wireless mobility.

BACKGROUND

As the next generation of cellular wireless evolves, deployments in 5G may see a variety of wireless deployments. In addition to cellular and smart phones, consumer electronics, home automation, smart sensors/internet of things, transportation, and the like may all use the 5G network in different ways and have different requirements. Moreover, the network may include macro base stations with small cell base stations deployed within those macro base stations. Moreover, some of these deployments will include mobility to enable a wireless device to be handed over from one access point to another.

SUMMARY

Methods and apparatus, including computer program products, are provided for mobility.

In some example embodiments, there may be provided a method. The method may include receiving, at a source base station, a single end marker indication for a flow associated with a user equipment being handed over to a target base station; determining, by the source base station and in response to the received single end marker indication, at least one bearer mapped to the flow; generating for each determined bearer, at least one end of marker indication; and sending, over a forwarding path from the source base station to the target base station, the generated at least one end of marker indication.

In some variations, one or more of the features disclosed herein including the following features can optionally be included in any feasible combination. The single end marker indication may represent a switch, at a core network, from to first path to the source base station to a second path to the target base station. The single end marker indication may include an identity of the flow. The single end marker indication may be carried by a packet and/or a header. The header may include a general packet radio service tunneling protocol header. The core network may include an anchor node for a handover, a serving gateway, and/or a packet gateway. The receiving at the source base station may be in response to a handover to the target base station. The determining may further include accessing a stored mapping of the flow to the at least one bearer. The at least one bearer may include a radio bearer. The flow may correspond to a service being accessed by the user equipment. The flow may correspond to a protocol data unit session. The target base station may be configured in accordance with long term evolution, and the source base station may be configured in accordance with 5G.

In some example embodiments, there may be provided a method. The method may include receiving, at a target base station, an end marker indication for a bearer associated with a flow to a user equipment being handed over to the target base station; determining, by the target base station and in response to the received end marker indication for the bearer, whether the target base station needs to wait for at least one additional end marker associated with another bearer associated with the same flow; and waiting, based on the determining, for the at least one additional end marker in order to determine that the flow has been switched.

In some variations, one or more of the features disclosed herein including the following features can optionally be included in any feasible combination. The end marker indication may represent a switch, at a core network, from a first path to source base station to second path to the target base station. The end marker indication may include an identity of the flow. The end marker indication may be carried by a packet and/or a header. The header may include a general packet radio service tunneling protocol header. The core network may include an anchor node for a handover, a serving gateway, and/or a packet gateway. The receiving at the source base station may be in response to a handover to the target base station. The determining may further include accessing a stored mapping of the flow to the at least one additional bearer. The at least one additional bearer may include a radio bearer. The flow may correspond to a protocol data unit session. The source base station may be configured in accordance with long term evolution, and the target base station may be configured in accordance with 5G.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Figure 1:
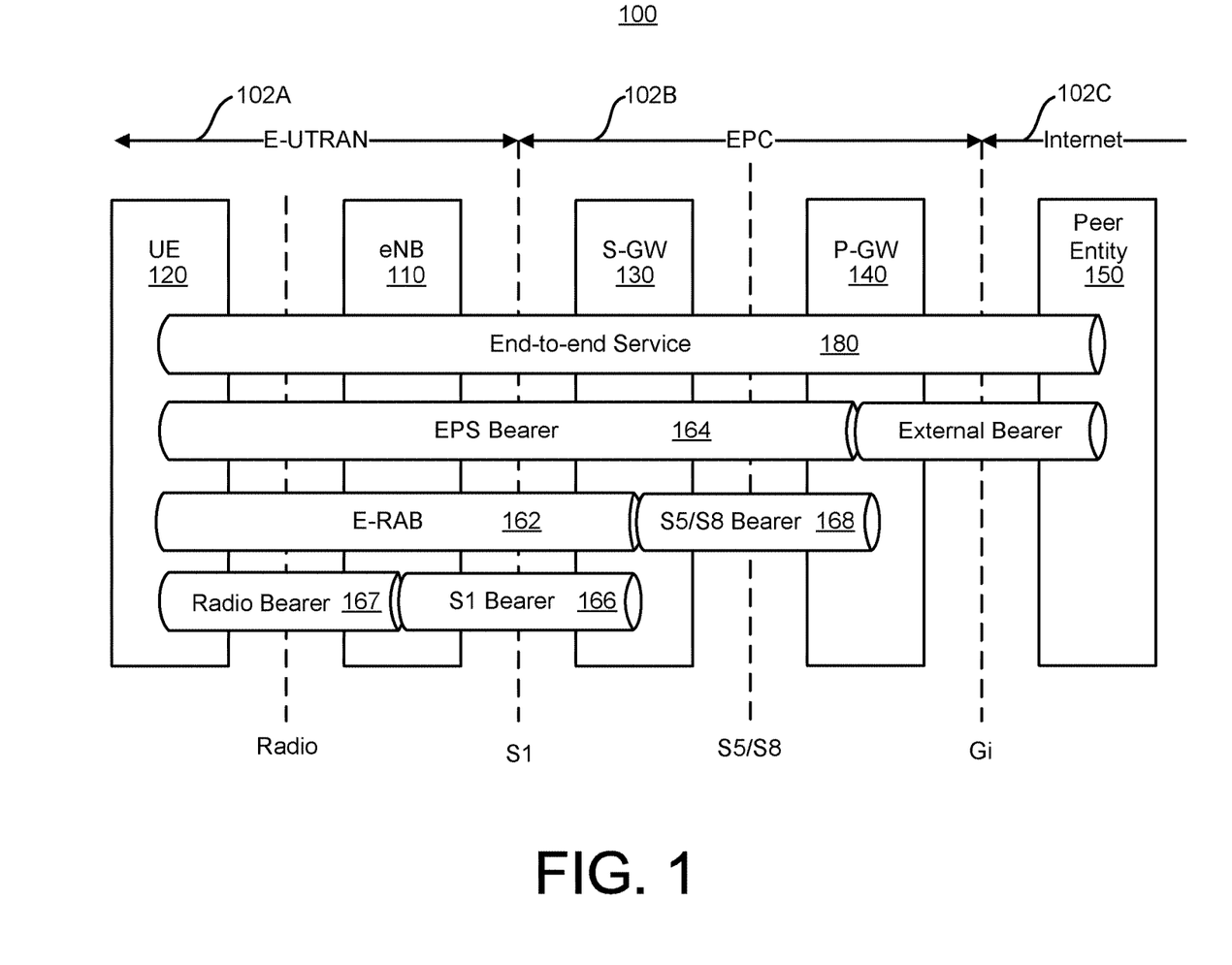
FIG. 1 depicts an example QoS architecture including bearers, in accordance with some example embodiments.

FIG. 1 depicts the bearer service architecture of the evolved packet system (EPS), in accordance with some example embodiments. The system 100 may include a radio access network 102A (labeled E-UTRAN, Evolved Universal Terrestrial Radio Access evolved,), a core network 102B (labeled EPC, evolved packet core), and a network 102C (labeled "Internet). The radio access network 102A may further include a user equipment 120 and a base station 110 (labeled eNB), while the core network 102B may further include a serving gateway (S-GW) 130 and a packet gateway (P-GW) 140. The network 102C may further include a peer entity 150.

With Long Term Evolution (LTE) technology, quality of service may rely on the bearer architecture shown at FIG. 1.

As described in 3GPP TS36.300 for example, the evolved-radio access bearer (E-RAB) 162 and the evolved packet system (EPS) bearer 164 are the supported level of granularity for bearer level quality of service (QoS) control in the core network and radio access network. Specifically, the EPS bearer and E-RAB may be established when the user equipment connects to a packet data network such as the internet (e.g., to obtain access to a service 180 provided by the peer entity 150), and the EPS bearer/E-RAB may serve as a default bearer persisted during the lifetime of the packet data network connection, which may provide the user equipment with always on IP connectivity to the packet data network. If an additional EPS bearer/E-RAB is established to the same packet data network, this additional bearer may be referred to as a dedicated bearer. The core network may decide whether to establish or modify a dedicated bearer, and the core network may assign bearer level QoS parameter values.

In LTE, the E-RAB 162 may provide packet transport between the user equipment 120 and the core network 102B. There may be a one-to-one mapping between the E-RAB 162 and a corresponding EPS bearer 164. For the EPS bearer 164, the data radio bearer 167 may provide packet transport between user equipment 120 and one or more eNB type base stations in the radio access network. There may also be a one-to-one mapping between the data radio bearer 167 and the EPS bearer 164 and E-RAB 162. The S1 bearer 166 may provide packet transport of an E-RAB 162 between a base station 110 and a serving GW 130. The S5/S8 bearer 168 may transport the packets of an EPS bearer between the serving GW 130 and a packet gateway 140 interfacing a data network such as the internet 102C. The user equipment 120 may store the mapping between an uplink packet filter and a data radio bearer to create the binding between a service data function (SDF) and a data radio bearer in the uplink. The packet gateway 140 may store a mapping between a downlink packet filter and an S5/S8 bearer 168 to create the binding between an SDF and an S5/S8 bearer 168 in the downlink. The base station 110 may store the one-to-one mapping between the data radio bearer 167 and the S1 bearer 166 to create the binding between the data radio bearer and the S1 bearer in both the uplink and downlink. The serving GW 130 may store the one-to-one mapping between an S1 bearer 166 and the S5/S8 bearer 168 to create the binding between the S1 bearer and the S5/S8 bearer in both the uplink and downlink.

In LTE, the serving gateway 130 (which may serve as an anchor node during the handover) may send an end marker for each bearer to assist the reordering functions at a target base station, as described in 3GPP TS 36.300 for example. After the downlink path is switched (at the serving gateway), downlink packets on the forwarding path (from the pre-handover, source base station) and downlink packets on the new direct path (directly from the serving gateway) may arrive out-of-order or interchanged at the target base station. Moreover, the target base station may deliver the forwarded packets to the user equipment before delivering some of the packets received on the new direct path. The end marker may assist the target base station with respect to this reordering function. Specifically, the serving gateway 130 may send, for each E-RAB of the user equipment, one or more end marker packets on the old path immediately after switching to the new direct path (the end marker indicating the path switch). The end marker packet, or message, may not contain any user data (e.g., the end marker may be indicated in the GPRS Tunneling Protocol, GTP, header). After the tagged end marker packets are sent, the serving gateway 130 may cease sending any additional user data packets via the old path to the source base station. When the end marker packets are received, the source base station may forward the end of marker packet toward the target base station, if forwarding is activated for a bearer. When the end marker is detected, the target base station may discard the end marker packet, and then the target base station may initiate processing to maintain in sequence delivery of user data forwarded over X2 interface (which is between base stations) and user data received from the serving GW over the S1 interface (which is between the core network and the target base station) due to the path switch at the serving gateway. Moreover, the end marker detection may trigger the target base station to also initiate the release of the data forwarding resource from the source base station.

In LTE, the core network 102B may include a serving gateway 130, and the serving gateway may provide a variety of functions, such as providing the local mobility anchor point for inter-base station handover and sending of one or more end marker indications, as noted above, to the source base station, source serving GPRS support node (SGSN,) or source radio network controller (RNC) immediately after switching the path during inter-base station (and/or inter-radio access technology) handover, especially to assist the re-ordering function at the base station, and/or other functions as described for example in 3GPP TS 29.281.

In next generation networks such as 5G and the like, QoS handling may be simplified. See, e.g., New Radio Access Technology (NR) [RP-160671], Study on Architecture and Security for next Generation System (NG) [SP-160227] and SA2 TR 23.799. In the core network (CN), a protocol data unit (PDU) session, or flow, for user plane traffic may be established between the user equipment and a data network. The PDU session may carry some (if not all) user plane traffic regardless of the QoS characteristics of individual traffic flows. Moreover, the 5G radio access network may include a content awareness function in the radio access network (CAF-RAN) that splits the incoming data packet of a PDU session into sub-flows or radio bearers (RB) in order to apply different QoS treatment in the radio protocols and air interface.

In an effort to simplify QoS handling, the concept of the EPS bearer may be replaced in 5G with PDU sessions and flows as noted. To illustrate further, the end-to-end service 180 may be handled as a PDU session by the core network, while another end-to-end service being accessed by the UE may be handled as another PDU session. The one-to-one mapping between EPS bearers and radio bearers and the EPS bearers may no longer be used in 5G, so the core network (CN) may be aware of the PDU sessions but not unaware of the radio bearers. During a mobility session between LTE and 5G, a problem may be created with the disappearance of bearer awareness in the core network and, in particular, the forwarding of packets to ensure lossless mobility. When moving from a 5G base station (having a 5G new radio, NR, air interface for example) to an LTE base station, the LTE base station may expect an end marker per established radio bearer; but the core network may not have any awareness of the radio bearers as the core network operates on PDU sessions rather than EPS bearers. On the other hand, when moving from the LTE base station to the 5G base station, a single end marker per radio bearer will be signaled.

Figure 2:
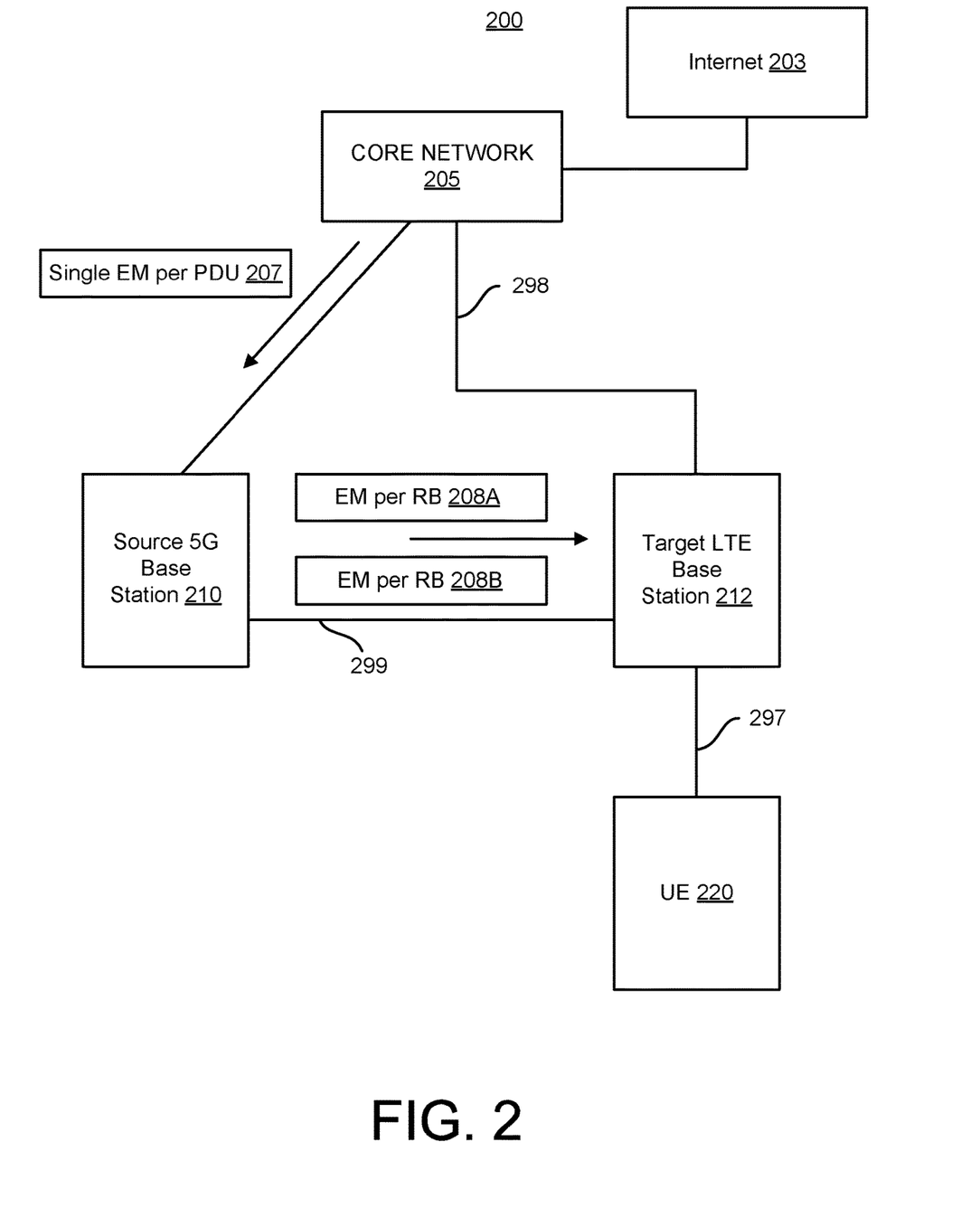
FIG. 2 depicts an example of a system showing a handover from a 5G base station to an LTE base station, in accordance with some example embodiments.

FIG. 2 depicts an example system 200, in accordance with some example embodiments. The system 200 depicts a user equipment 220 in a handover from a source base station 210 to a target base station 212. In this example, the source base station 210 may be configured in accordance with 5G (having for example an NR, new radio, air interface), while the target base station 212 may be configured in accordance with Long Term Evolution (LTE). As noted above, the core network 205 may handle QoS on a PDU session basis, so the core may not be aware of individual radio bearers mapped to the PDU session, which may cause the above-noted problems with end marker signaling.

Although some of the examples herein refer to certain types of base stations, such as 5G and LTE base stations, other types of base stations, including femtocell base stations, home eNB base station, picocell base station, small cell base stations, and/or other wireless access points may be used as well. Moreover, although some of the examples herein refer to certain types radio access technologies, such as 5G, NR, and LTE, other types of radio technologies may be used as well.

In the example of FIG. 2, the source base station 210 may be forwarding, via a forwarding path 299 (for example, via a tunnel), to the target base station 212 user traffic to target base station 212 to enable a so-called seamless handover.

In some example embodiments, the core network 205 may include a network node (e.g., a serving gateway and/or the like) that may send, for a given PDU session, a single end marker indication 207 to the source base station 210. In 5G, the core network 205 may, as noted, have awareness of a PDU session to a given UE, but may not have bearer and radio bearer awareness. As such, the core network 205 may, in some example embodiments, be able to send (due in part to its PDU session-based awareness rather than bearer awareness) only a single end marker indication 207, for the PDU session, to the source 5G base station 210. In some example embodiments, the single end marker indication 207 may thus be sent on a per PDU-session-basis.

In response to receiving the single end marker indication 207 for the given PDU session, the source 5G base station 210 may determine the corresponding radio bearers for the PDU session associated with the received end marker indication 207. In some example embodiments, the source 5G base station may store, or have access to, mappings between each PDU session and the corresponding radio bearers; from the stored mappings, radio bearers may be determined for the PDU session associated with the received end marker indication 207. Next, for each determined radio bearer, the source 5G base station may generate an end marker indication, such as messages 208A-B. Although the end marker indications are described as being messages, the end marker indication may be signaled in other ways. For example, the end marker indication may comprise an indication in a header (e.g., GTP-header), a packet, and/or the like.

To illustrate further, the source 5G base station 210 may, in response to receiving message 207, determine that the PDU session (which is associated as the received end marker indication 207) may map to two radio bearers. Next, the source 5G base station may generate, for each determined radio bearer, end marker indications 208A-B, and then send the generated messages via forwarding path 299 to the target LTE base station 212. The end marker indications 208A-B may thus be considered per radio bearer indications.

In response to receiving per radio bearer end marker indications 208A-B (which were generated by the source 5G base station 210), the target LTE base station 212 may discard the end marker indications 208A-B (e.g., so the markers never reach the UE). The target base station 212 may also proceed to maintain in sequence delivery of user data forwarded, via the radio link 297, to the user equipment 220 from forwarding path 299 as well as path 298 from the core network 205. Moreover, when the target base station 316 receives the end marker indications 208A-B, the receipt may trigger the target base station 212 to take other actions as well, such as initiate the release of the data-forwarding path 299. For example, the end markers 208A-B may indicate to the base station 212 that the core network 205 has switched to path 298 so it can disregard packets from path 299 and/or release path 299 altogether.

Figure 3:
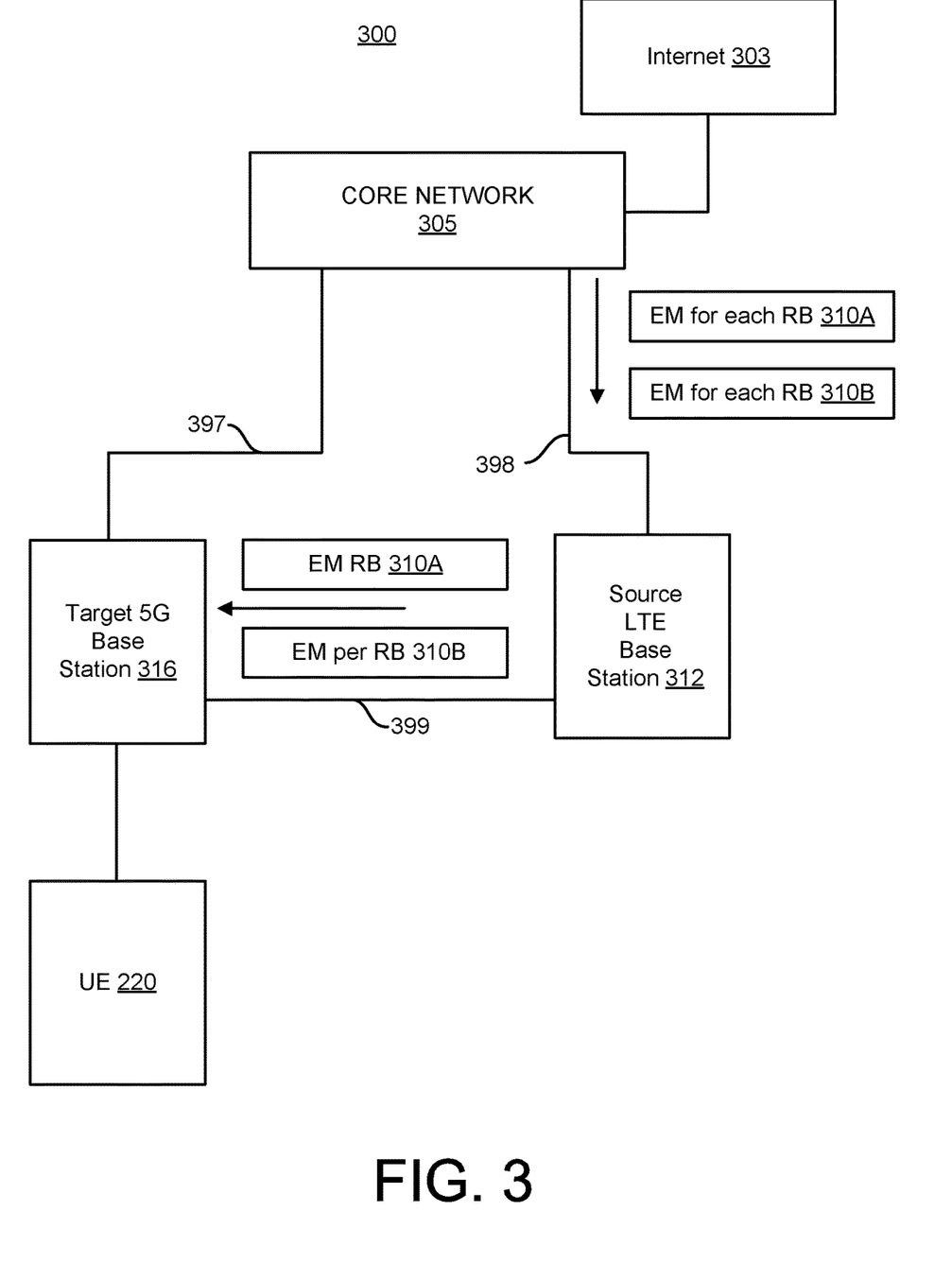
FIG. 3 depicts an example of a system showing a handover from an LTE base station to a 5G base station, in accordance with some example embodiments.

FIG. 3 depicts an example system 300, in accordance with some example embodiments. The system 300 depicts the user equipment 220 in a handover from a source LTE base station 312 to a target 5G base station 316. In the core network 305, the core network may send an end marker for each radio bearer for which the core network is aware.

In the example of FIG. 3, the core network 305 may send the source LTE base station 312 an end marker indication 310A-B for each radio bearer. In the example of FIG. 3, the core network 305 (e.g., a serving gateway, an anchor node, and/or network node) may determine that the user equipment 220 being handed over to target base station 316 has 2 radio bearers, so the core network 305 may send via path 398 end marker indications 310A-B.

When the source base station 312 receives the end marker indications 310A-B, the source base station may forward end marker indications 310A-B to the target 5G base station 316, when forwarding via forwarding path 399 to the target base station is enabled. In response to receiving the end marker indications 310A-B, the target 5G base station 316 may discard the end marker message (or packet, and/or the like), and then the target base station 316 may proceed to maintain in sequence delivery of user data forwarded to the user equipment 220 from forwarding path 399 as well as path 397. Moreover, the end marker detection may trigger the target base station 316 to take other actions as well, such as initiate the release of the data-forwarding path 399 for the corresponding bearer.

In some example embodiments, the target base station 316 may wait until it receives all of the end markers from the source base station 312. For example, the target base station may, for a given flow such as a PDU session, receive end marker 310A. The target base station may determine that end marker 310A maps to a certain flow/PDU session. For example, the end marker 310A may identify the flow/PDU session. Moreover, the target base station 316 may store for each flow/PDU session being handled by the target based station, and thus determine that the flow/PDU session maps to a certain quantity of bearers (e.g., 2 bearers, 3 bearers, although other quantities may be used as well). When this is the case, the target base station may wait until any remaining end markers (for the same flow) are received. After all of the end markers are received for the flow/PDU session, the target base station may switch to receiving the packet flow from the core network and/or release the path 399.

To illustrate further, target base station 316 may receive end marker indication 310A for a bearer associated with a flow to user equipment 220. In response, the target base station may determine whether the target base station needs to wait for at least one additional bearer associated with the flow. For example, the target base station may determine whether the flow maps to a plurality of bearers and if so decide to wait for other end markers associated with that same flow, such as end marker 310B. As noted, the target base station may include a mapping of flows/PDU session to bearers, so the target base station can determine that end marker 310B is also associated with the flow/PDU session so in this example the target base station needs to wait for that last end marker 310B. When the end marker is received for the last end marker 310B for the flow, this may indicate to the target base station that it can proceed as if the flow has been switched to the new path and take other actions (e.g., discard the end markers and the like).

In the example of FIG. 3 example, the target 5G base station 316 may be aware of the mapping of radio bearers to the flow/PDU session that will exist after the handover (on path 397 between 316 and 305), but the target base station may waits until all end markers (e.g., of the radio bearer that map to the flow/PDU session) before terminating the forwarding and switch path to 397.

Figure 4:
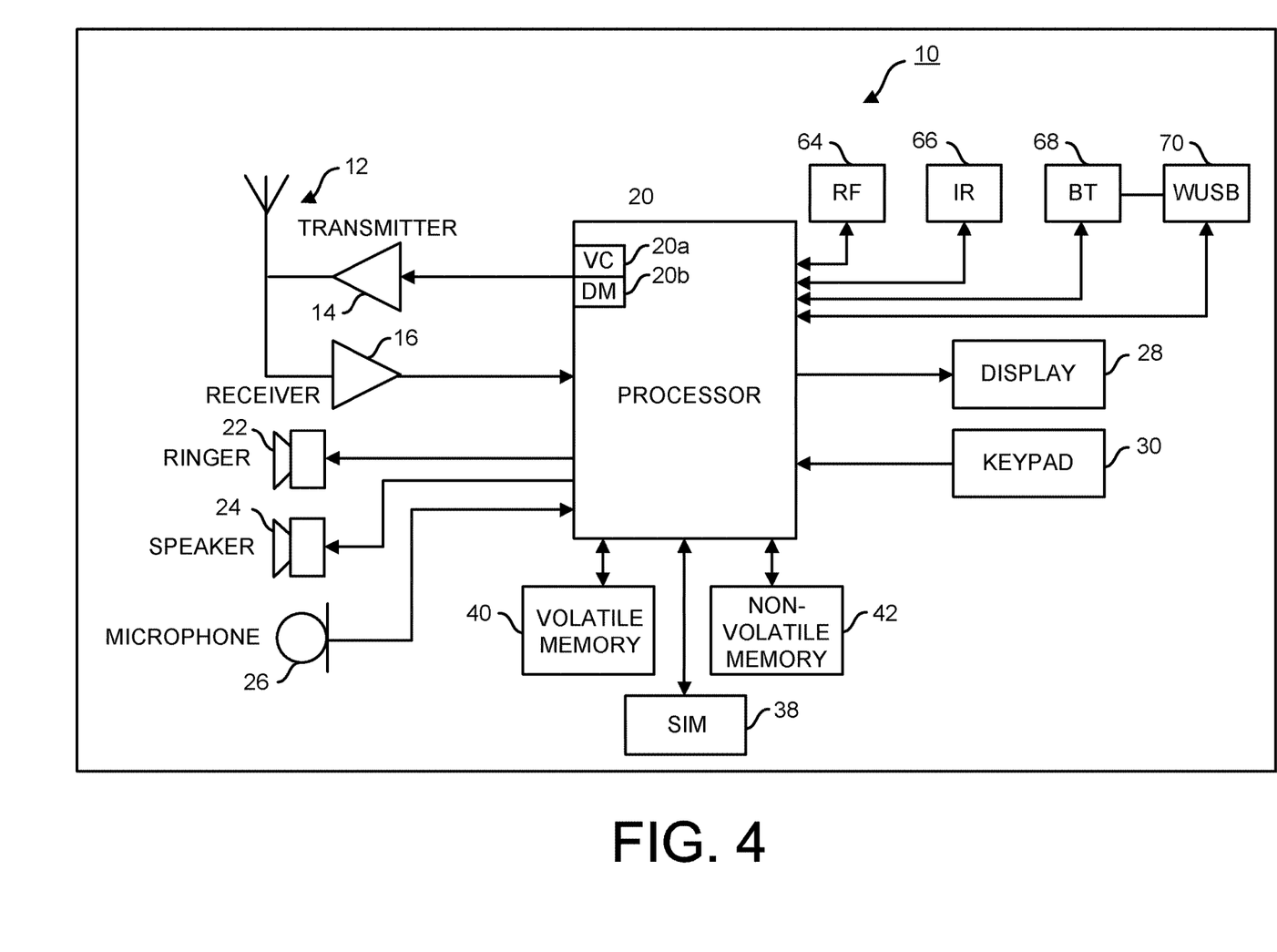
FIG. 4 depicts an example of an apparatus, in accordance with some example embodiments.

FIG. 4 illustrates a block diagram of an apparatus 10, in accordance with some example embodiments. The apparatus 10 (or portions thereof) may be configured to provide a radio, such as user equipment (e.g., user equipment 120, 220, and/or the like) and/or a base station (e.g., base station 210, 212, 316, 312, and/or the like). The apparatus may be implemented as any device including a wireless device, a smart phone, a cell phone, a machine type communication device, a wireless sensor, a radio relay, an access point, and/or any other radio including a processor and memory based device.

For example, the apparatus may comprise source base station 210 and store mappings between a PDU session and bearers, such as radio bearers, determine, for a given PDU session, mapping to a bearer, generate per-bearer end marker messages, and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/ or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to a user equipment and/or a base station. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment and/or a base station as described for example with respect to FIGS. 2 and 3.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 11, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is to provide data forwarding for lossless mobility to work efficiently across LTE and 5G.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
    receiving, at a source base station, a single end marker indication for a protocol data unit (PDU) session associated with a user equipment being handed over to a target base station, wherein the single end marker indication represents a switch, at a core network, from a first path to the source base station to a second path to the target base station, and wherein the single end marker indication is carried by a packet and/or a header, the header comprises a general packet radio service tunneling protocol header;
    determining, by the source base station and in response to the received single end marker indication, bearers mapped to the PDU session;
    generating for each determined bearer, at least one end marker indication; and
    sending, over a forwarding path from the source base station to the target base station, the generated at least one end of marker indication for each determined bearer.

2. The method of claim 1, wherein the single end marker indication includes an identity of the flow.

3. The method of claim 1, wherein the determining further comprises accessing a stored mapping of the flow to the at least one bearer.

4. The method of claim 1, wherein the at least one bearer comprises a radio bearer.

5. A source base station comprising:
    at least one processor; and
    at least one memory including computer program code, the at least one memory and computer program code configured to, with the at least one processor, cause the source base station to at least:
        receive a single end marker indication for a protocol data unit (PDU) session associated with a user equipment being handed over to a target base station, wherein the single end marker indication represents a switch, at a core network, from a first path to the source base station to a second path to the target base station, and wherein the single end marker indication is carried by a packet and/or a header, the header comprises a general packet radio service tunneling protocol header;
        determine, in response to the received single end marker indication, bearers mapped to the PDU session;
        generate for each determined bearer, at least one end marker indication; and
        send, over a forwarding path from the source base station to the target base station, the generated at least one end marker indication for each determined bearer.

6. The source base station of claim 5, wherein the single end marker indication includes an identity of the PDU session.

7. The source base station of claim 5, wherein the single end marker indication is received in response to a handover to the target base station.

8. The source base station of claim 5, wherein the determining further causes the source base station to at least access a stored mapping of the PDU session to the bearers.

9. The source base station of claim 5, wherein the bearers comprise a radio bearer.

10. A target base station comprising:
    at least one processor; and
    at least one memory including computer program code, the at least one memory and computer program code configured to, with the at least one processor, cause the target base station to at least:
        receive an end marker indication for a bearer associated with a protocol data unit (PDU) session to a user equipment being handed over to the target base station, wherein the end marker indication represents a switch, at a core network, from a first path to a source base station to a second path to the target base station, and wherein the end marker indication is carried by a packet and/or a header, the header comprises a general packet radio service tunneling protocol header;
        determine, in response to the received end marker indication for the bearer, whether the target base station needs to wait for at least one additional end marker associated with another bearer associated with the same PDU session; and
        wait, based on the determination, for the at least one additional end marker in order to determine that the PDU session has been switched.

11. The target base station of claim 10, wherein the end marker indication includes an identity of the PDU session.

12. The method of claim 1, wherein the core network comprises an anchor node for a handover, a serving gateway, and/or a packet gateway.

13. The method of claim 1, wherein the receiving at the source base station is in response to a handover to the target base station.

14. The method of claim 1, wherein the PDU session corresponds to a service being accessed by the user equipment.

15. The method of claim 1, wherein the target base station is configured in accordance with long term evolution, and the source base station is configured in accordance with 5G.

16. The source base station of claim 5, wherein the core network comprises an anchor node for a handover, a serving gateway, and/or a packet gateway.

17. The source base station of claim 5, wherein the PDU session corresponds to a service being accessed by the user equipment.

18. The source base station of claim 5, wherein the target base station is configured in accordance with long term evolution, and the source base station is configured in accordance with 5G.

19. The target base station of claim 10, wherein the at least one additional bearer comprises a radio bearer.

20. The target base station of claim 10, wherein the core network comprises an anchor node for a handover, a serving gateway, and/or a packet gateway.

* * * * *

UNITED STATES PATENT AND TRADEMARK OFFICE
CERTIFICATE OF CORRECTION

PATENT NO. : 10,524,176 B2  
APPLICATION NO. : 16/321360  
DATED : December 31, 2019  
INVENTOR(S) : Guillaume Decarreau et al.

Page 1 of 1

It is certified that error appears in the above-identified patent and that said Letters Patent is hereby corrected as shown below:

In the Claims

At Column 11, Claim number 1, Line number 43, should read, "one end marker indication for each determined"

At Column 11, Claim number 2, Line number 46, should read, "indication includes an identity of a flow"

At Column 11, Claim number 3, Line number 48, should read, "comprises accessing a stored mapping of a flow to the at"

Signed and Sealed this  
Thirty-first Day of March, 2020

Andrei Iancu  
*Director of the United States Patent and Trademark Office*